United States Patent [19]
Watanabe

[11] Patent Number: 5,098,170
[45] Date of Patent: Mar. 24, 1992

[54] VACUUM BOOSTER

[75] Inventor: Namio Watanabe, Saitama, Japan

[73] Assignees: Akebono Brake Industry Co., Inc., Tokyo; Akebono Research and Development Centre Ltd., Saitama, both of Japan

[21] Appl. No.: 476,794

[22] Filed: Feb. 8, 1990

[30] Foreign Application Priority Data

Feb. 13, 1989 [JP] Japan .................. 1-33073

[51] Int. Cl.$^5$ .............................. B60T 8/44
[52] U.S. Cl. ...................... 303/113 TB; 180/197; 188/356; 303/114 PN
[58] Field of Search .............. 303/114, 119, 110, 118, 303/113, 93, 101, 100, 13-16, 115, 50-56; 188/356, 357, 353, 181 R, 181 A; 180/197; 91/369.1, 365, 361, 6, 376 R, 391 A, 369.6; 192/1.33, 1.35, 1.23

[56] References Cited

U.S. PATENT DOCUMENTS

| | | | |
|---|---|---|---|
| 3,559,532 | 2/1971 | MacDuff et al. | 303/114 X |
| 4,610,483 | 9/1986 | Matsumoto et al. | 303/114 X |
| 4,681,196 | 7/1987 | Fulmer et al. | 192/1.35 |
| 4,759,255 | 7/1988 | Shimamura | 91/6 |
| 4,778,225 | 10/1988 | Rudolph et al. | 188/356 X |
| 4,871,215 | 10/1989 | Takayama | 303/114 X |
| 4,875,740 | 10/1989 | Takayama | 188/356 X |
| 4,893,691 | 1/1990 | Park | 188/353 X |
| 4,930,607 | 6/1990 | Shimamura et al. | 192/1.33 |
| 4,932,727 | 6/1990 | Wagner et al. | 188/357 X |

FOREIGN PATENT DOCUMENTS

| | | | |
|---|---|---|---|
| 2311580 | 9/1973 | Fed. Rep. of Germany | 188/357 |
| 2716471 | 10/1978 | Fed. Rep. of Germany | 303/114 |
| 3605295 | 10/1986 | Fed. Rep. of Germany | 303/114 |
| 3715839 | 11/1988 | Fed. Rep. of Germany | 303/114 |
| 0134048 | 8/1984 | Japan | 303/114 |
| 0015152 | 1/1987 | Japan | 303/114 |
| 2198201 | 6/1988 | United Kingdom | 303/114 |
| 2219368 | 12/1989 | United Kingdom | 303/114 |

Primary Examiner—Douglas C. Butler
Attorney, Agent, or Firm—Finnegan, Henderson, Farabow, Garrett and Dunner

[57] ABSTRACT

A vacuum booster for use with a vehicle anti-locking brake system to constitute a traction control system for preventing the slip operation of the vehicle driving wheel during starting or accelerating the vehicle, comprising a main opposing pressure chamber, an auxiliary opposing pressure chamber, a continuous pressure chamber, an operation rod and a pair of valves for independently controlling each of the main and auxiliary opposing pressure chambers so that control of the slip operation of the vehicle driving wheel can be performed without depressing the vehicle brake pedal.

5 Claims, 2 Drawing Sheets

VACUUM BOOSTER

BACKGROUND OF THE INVENTION

1. Field of the Invention

The present invention relates to a vacuum booster and, more particularly, to a vacuum booster which can be easily combined with a vehicle anti-locking brake system to comprise a traction control system.

2. Description of the Related Art

Conventional vacuum boosters used with vehicle braking systems typically comprise a shell having an interior which is divided by a diaphragm into a continuous pressure chamber and an opposing pressure chamber, and a valve casing, which moves in conjunction with the diaphragm, coupled to a master cylinder. To brake the vehicle, the operator of the vehicle depresses the brake pedal, which is attached to the valve casing, so that the valve casing is moved along its longitudinal axis thereby triggering the action of the master cylinder and brake pads.

Usually, negative pressure created in the intake manifold of the vehicle engine is applied to both the continuous pressure chamber and the opposing pressure chamber so that the valve casing is in a state of equilibrium when the vehicle is not being braked. When the operator of the vehicle depresses the brake pedal, however, the opposing pressure chamber is exposed to the atmosphere thereby producing a pressure differential between both the constant and opposing pressure chambers. This pressure differential is used to assist in braking by supplying an additional force to the valve casing in the same direction as the force due to the operator's depressing of the brake pedal. The conventional vacuum booster is installed in the vehicle so that it operates only when the brake pedal of the vehicle is depressed.

In some cases during the starting or acceleration of a vehicle, the driving wheel performs a slip rotation whereby the steering stability of the vehicle is lost, thus putting the vehicle in danger. In these instances, it is desired to perform a traction control of the driving wheel to prevent the slip rotation thereof. A traction control system can comprise an anti-locking brake system combined with a vacuum booster. However, because the person operating the vehicle does not typically brake the vehicle at the time traction control is needed, a traction control system cannot be built in a simple manner by using an anti-locking brake system and the conventional vacuum booster. To build a traction control system using an anti-locking brake system combined with the conventional vacuum booster, a special hydraulic line, a valve, and so forth would be needed whereby the constitution of the system would be very complicated.

SUMMARY OF THE INVENTION

An object of the present invention is a vacuum booster that solves the above problems associated with the conventional vacuum booster.

Another object of the present invention is a vacuum booster that can be easily combined with the hydraulic control circuit of an anti-locking brake system to comprise a traction control system for performing the traction control of the driving wheel of a vehicle through the opening or closing of a solenoid valve and the turning on or turning off of a pump.

These and other objects are accomplished by a vacuum booster for moving a valve casing in a first direction comprising a main opposing pressure chamber for exerting a first pressure on the valve casing in the first direction, the first pressure being generated by a first pressure source, an auxiliary opposing pressure chamber for exerting the first pressure on the valve casing in the first direction, a continuous pressure chamber for exerting a second pressure on the valve casing in a second direction opposite the first direction, the second pressure being less than the first pressure and generated by a second pressure source related to a partial vacuum, and means for independently controlling each of the main opposing pressure chamber and the auxiliary opposing pressure chamber whereby at least one of the main opposing pressure chamber and the auxiliary opposing pressure chamber exerts the first pressure on the valve casing to move the valve casing in the first direction.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention. In the drawings.

DESCRIPTION OF THE PREFERRED EMBODIMENT AND METHOD

Figure 1:
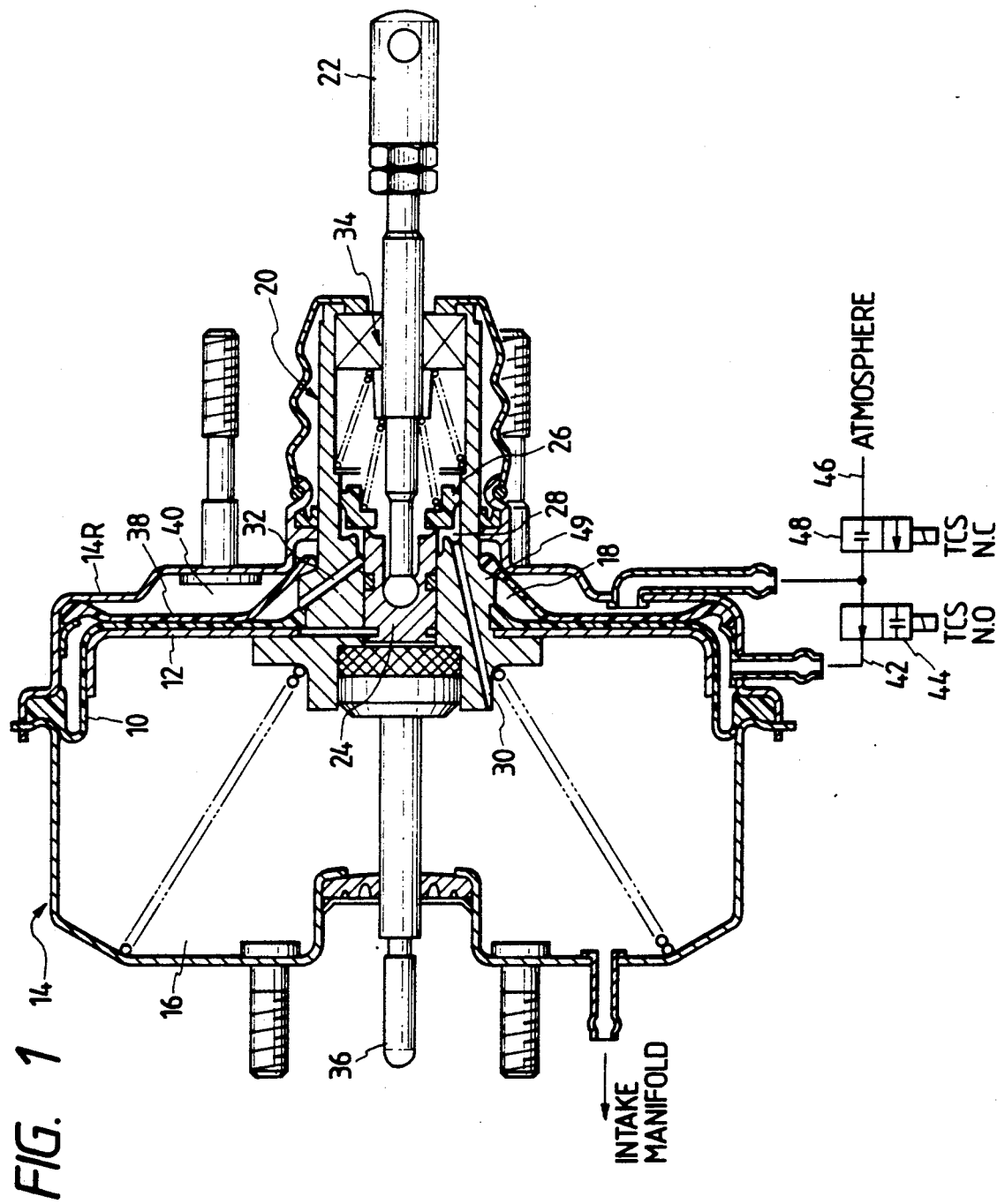
FIG. 1 is a cross-sectional view of a vacuum booster as applied in an embodiment of the present invention.

Reference will now be made in detail to the presently preferred embodiment and method of the invention as illustrated in the accompanying drawings, in which like reference characters designate like or corresponding parts throughout the several drawings.

According to the present invention, an auxiliary diaphragm is provided in a vacuum booster so that an auxiliary opposing pressure chamber is defined and can be connected to a main opposing pressure chamber through a passage provided with a normally-open solenoid valve and can be connected to an atmosphere passage provided with a normally-closed solenoid valve. These solenoid valves are operated for the traction control of the driving wheel of a vehicle. For these reasons, a traction control mechanism can comprise the vacuum booster of the present invention and an anti-locking brake system in a very simple manner.

As shown in FIG. 1, the vacuum booster provided in accordance with the present invention comprises shell 14 having an interior divided into continuous pressure chamber 16 and main opposing pressure chamber 18 by main diaphragm 10. Auxiliary diaphragm 38 is provided adjacent to main diaphragm 10 whereby auxiliary opposing pressure chamber 40 is defined adjacent to the side of main opposing pressure chamber 18 opposite continuous pressure chamber 16. Communication passage 42 for connecting both main and auxiliary opposing pressure chambers 18 and 40 to each other is provided and normally-open control valve 44 is installed in communication passage 42. Atmosphere passage 46 for connecting the atmosphere outside the vacuum booster shell with auxiliary opposing pressure chamber 40 is also provided, and normally-closed control valve 48 is installed in atmosphere passage 46. Both control valves 44 and 48 are operated during the traction control mode so that the pressure differential between continuous pressure chamber 16 and auxiliary opposing pressure chamber 40 causes valve casing 20 to move.

When slipping rotation of the driving wheel of the vehicle is detected, main and auxiliary opposing pressure chambers 18 and 40 are disconnected from each other, thus leaving the vacuum booster to perform the normal boosting function thereof and normally-closed control valve 48 installed in atmosphere passage 46 is opened so that the external air necessary for traction control is introduced into auxiliary opposing pressure chamber 40. The external air produces the pressure differential between continuous pressure chamber 16 and auxiliary pressure chamber 40 necessary to generate hydraulic movement of valve casing 20. The traction control of the driving wheel is performed by the hydraulic pressure through the opening or closing of the solenoid valves of the anti-locking brake system and the turning-on or turning-off of the pump of the system. The vacuum booster of the present invention is thus easily combined with the hydraulic control circuit of the anti-locking brake system to comprise the traction control mechanism, for example, to provide a rapidly pulsed mode of operation.

Embodiment

In the vacuum booster of FIG. 1, to which the negative pressure in the intake manifold of the engine of a motor vehicle or the like is applied for boosting, the interior of shell 14 is divided into continuous pressure chamber 16 and main opposing pressure chamber 18 by main diaphragm 10 coupled to diaphragm support plate 12. The movement of diaphragm 10 and diaphragm support plate 12, which is caused by a pressure differential between both continuous pressure chamber 16 and opposing pressure chamber 18, causes valve casing 20, which is secured to the central portion of main diaphragm 10, to move. The pressure differential is produced when the negative pressure in the intake manifold of the vehicle engine is applied to continuous pressure chamber 16 and a positive atmospheric pressure is applied to opposing pressure chamber 18.

To apply the atmospheric pressure to opposing pressure chamber 18, a valve mechanism in valve casing 20 is operated by moving operation rod 22. Operation rod 22 is moved by depressing the vehicle brake pedal. The valve mechanism includes valve plunger 24 and poppet valve 26 which are housed in valve casing 20 so that valve plunger 24 can be moved in the axial direction thereof and poppet valve 26 can be put in and out of contact with the rear end of valve plunger 24. Valve plunger 24 and poppet valve 26 are pushed inward by the movement of operation rod 22.

When poppet valve 26 is moved to a prescribed position by an inward push of operation rod 22, poppet valve 26 goes out of contact with valve plunger 24. When valve plunger 24 and poppet valve 26 are in contact with each other, gap 28 is created between the inside surface of valve casing 20; and the peripheral surfaces of the portions of valve plunger 24 and poppet valve 26 are in contact with one another.

First passage 30, which connects gap 28 with continuous pressure chamber 16, and second passage 32, which connects gap 28 and main opposing pressure chamber 18, are opened through valve casing 20 so that both continuous pressure chamber 16 and main opposing pressure chamber 18 remain connected to each other as long as the motor vehicle is not braked, i.e., when operation rod 22 is not moved inward. When operation rod 22 is pushed inward for braking the vehicle, poppet valve 26 is first moved inward so that first passage 30 is closed when poppet valve 26 has reached the inner end of the stroke thereof. Valve plunger 24 is thereafter pushed inward further so that gap 28, defined between poppet valve 26 and valve plunger 24, is connected to second passage 32. As a result, atmosphere passage 34 connects with main opposing pressure chamber 18 through second passage 32 so that a pressure differential is created between continuous pressure chamber 16 and main opposing pressure chamber 18, and valve casing 20 is moved. Push rod 36 coupled to valve casing 20 is thus actuated by the boosted power.

To use the vacuum booster of the present invention as a hydraulic power source for the traction control of the driving wheel of the motor vehicle, auxiliary diaphragm 38 is provided along main diaphragm 10 so that auxiliary opposing pressure chamber 40 is created adjacent to the side of main opposing pressure chamber 18 opposite continuous pressure chamber 16. The peripheral portion of auxiliary diaphragm 38 is secured to rear section 14R. The central portion of auxiliary diaphragm 38 is secured to the peripheral portion of valve casing 20 so that auxiliary diaphragm 38 is coupled to valve casing 20 at the place of the inner end of the stroke of valve casing 20.

The joint between auxiliary diaphragm 38 and valve casing 20 is located between the outer peripheral edge of body 49 of valve casing 20 and the central edge of rear section 14R outside the outer portion of second passage 32 so that auxiliary diaphragm 38 serves as a buffer between valve casing 20 and rear section 14R. Auxiliary opposing pressure chamber 40 is thus located next to main opposing pressure chamber 18, which is located next to continuous pressure chamber 16. The pressure in auxiliary opposing pressure chamber 40 can be controlled independently of the valve mechanism in valve casing 20. For the control of the pressure in auxiliary opposing pressure chamber 40, communication passage 42 is provided to connect main and auxiliary opposing pressure chambers 18 and 40 to each other. Normally-open solenoid valve 44 is installed in communication passage 42 so that main and auxiliary opposing pressure chambers 18 and 40 are normally at the same pressure. Auxiliary opposing pressure chamber 40 can be connected alone to atmosphere passage 46 in which normally-closed solenoid valve 48 is installed. Solenoid valves 44 and 48 are control valves for the traction control of the driving wheel of the motor vehicle, and can be energized when the slip rotation of the driving wheel is detected by a suitable means not shown.

Figure 2:
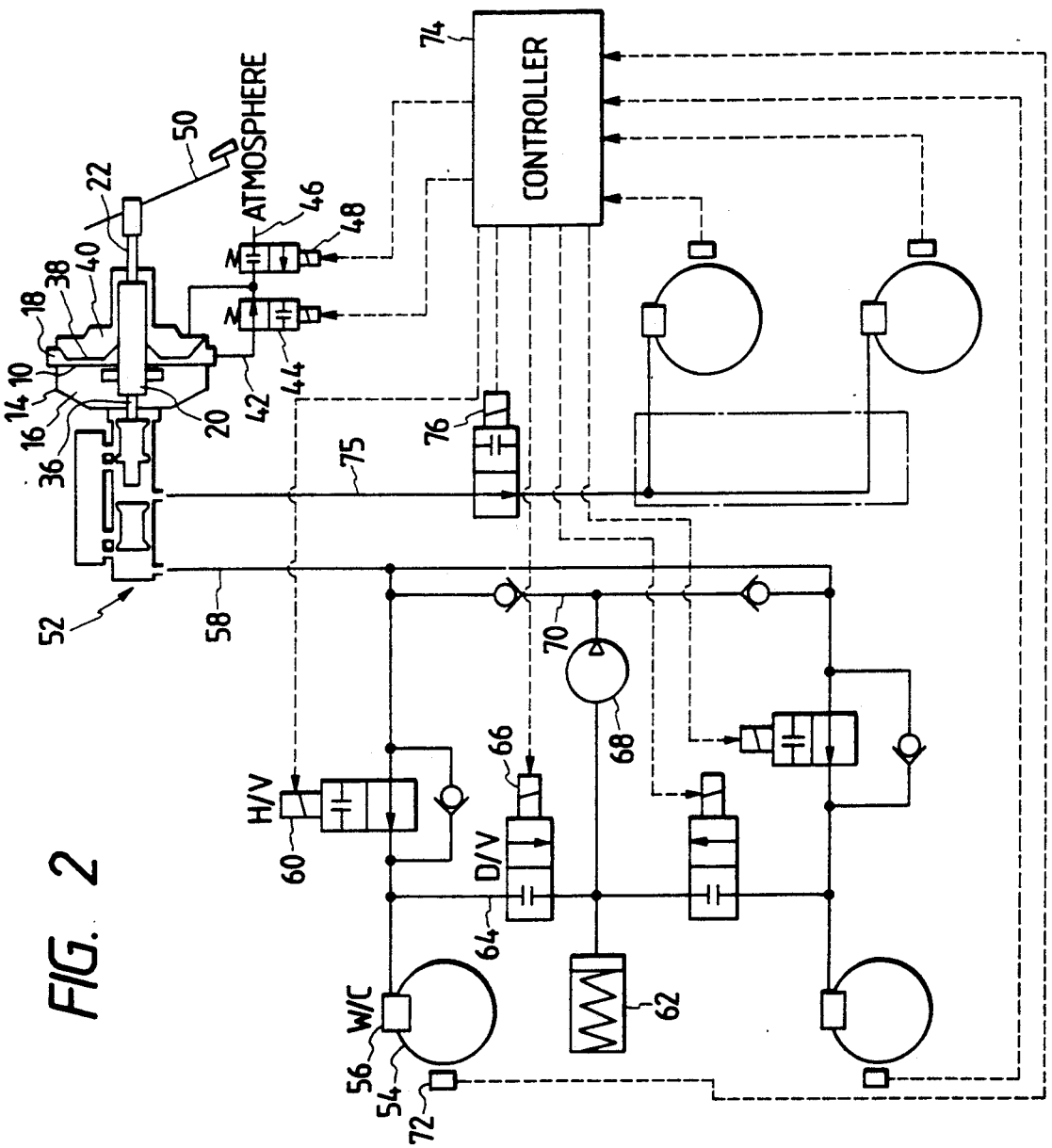
FIG. 2 is a block diagram of a vehicle traction control system provided with the vacuum booster of the present invention.

FIG. 2 shows an anti-locking brake system connected to the vacuum booster of the present invention to constitute a traction control mechanism. A braking force is applied from brake pedal 50 of the motor vehicle to the vacuum booster through operation rod 22 so that boosted power is transmitted to master cylinder 52 through push rod 36. Hydraulic pressure generated in master cylinder 52 by the boosted power is applied to brake 56 of driving wheel 54 through main pipe 58. The anti-locking brake system of FIG. 2 includes normally-open inlet valve 60 installed in main pipe 58, release pipe 64 ramified from main pipe 58 downstream to inlet valve 60 to release the pressure of brake 56 to reservoir 62, and outlet valve 66 installed in release pipe 64.

The brake system of FIG. 2 also includes circulation pipe 70 to which electric pump 68 is connected to return a working liquid from reservoir 62 to main pipe 58 through circulation pipe 70. Sensor 72 is provided at driving wheel 54 for detecting its rotational frequency. A detection signal is sent out from sensor 72 to controller 74. Controller 74, in turn, sends out opening or closing signals to solenoid valves 44 and 48, inlet valve 60, and outlet valve 66. When controller 74 has determined from the detection signal generated by sensor 72 that driving wheel 54 is locked at the braking thereof, controller 74 operates the anti-locking brake system to regulate inlet valve 60 and outlet valve 66.

When controller 74 has determined from the detection signal generated by sensor 72 that driving wheel 54 is experiencing slipping rotation at the start or acceleration of the vehicle, controller 74 closes main pipe 75 for the non-driving wheels of the vehicle, closes solenoid valve 44 at the side of the vacuum booster, and opens solenoid valve 48 at the side of the vacuum booster in order to apply a moving force to valve casing 20.

The traction control of driving wheel 54 through the use of the vacuum booster of the present invention will now be described. When slipping rotation of driving wheel 54 is detected by sensor 72, controller 74 sends out a closing signal to solenoid valve 76 at the side of the non-driving wheels, closes normally-open solenoid valve 44, and opens normally-closed solenoid valve 48, so that main and auxiliary opposing pressure chambers 18 and 40 of the vacuum booster are disconnected from one another and the atmospheric pressure is applied to auxiliary opposing pressure chamber 40. The result is a pressure differential produced between both main and auxiliary opposing pressure chambers 18 and 40 divided from each other by auxiliary diaphragm 38. As a result, valve casing 20 is moved so that the hydraulic pressure is generated in master cylinder 52. Brake 56 for driving wheel 54 is operated by the hydraulic pressure to brake driving wheel 54. Inlet valve 60 and outlet valve 66 for driving wheel 54 are regulated to be opened or closed until the slip rotation of driving wheel 54 is reduced. The braking liquid drained to reservoir 62 through outlet valve 66 is pumped out from reservoir 62 to the upstream side of inlet valve 60 by electric pump 68 so that the liquid is ready to be pressurized again.

Normally-open solenoid valve 44 installed in communication passage 42 for connecting both main and auxiliary opposing pressure chambers 18 and 40 to each other can be closed after the braking of driving wheel 54 to keep valve casing 20 in a prescribed position whereby a prescribed braking pressure is maintained.

Additional advantages and modifications of the present invention will be readily apparent to those skilled in the art. For example, although only the braking connections for driving wheels 54 are described above with regard to the present invention, braking connections for other driving and non-driving wheels of the vehicle can be similarly provided. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A vacuum booster for moving a valve casing in a first direction, comprising:
   a main diaphragm;
   a shell slidable with the valve casing, said shell being divided by said main diaphragm into a continuous pressure chamber communicating with a vacuum source and a variable pressure chamber changeably communicating with the vacuum source and an atmosphere;
   an auxiliary diaphragm provided adjacent to said main diaphragm, said auxiliary diaphragm dividing said variable pressure chamber into a main opposing pressure chamber and an auxiliary opposing pressure chamber, said auxiliary opposing pressure chamber being disposed adjacent to said main opposing pressure chamber, said main opposing pressure chamber selectively communicating with the vacuum source through the valve casing and said continuous pressure chamber, said auxiliary opposing pressure chamber communicating with the atmosphere through a normally-closed first valve, said main opposing pressure chamber and said auxiliary opposing pressure chamber being in communication with each other through a normally-open second valve; and
   a third valve provided in the valve casing, responsive to an operation of a brake pedal, for causing a pressure differential between said continuous pressure chamber and said main opposing pressure chamber,
   whereby the valve casing moves in the first direction by the pressure differential caused between said continuous pressure chamber and said auxiliary opposing pressure chamber by operating said first and second valves without operating said third valve.

2. The vacuum booster of claim 1, wherein said main opposing pressure chamber is defined between said main diaphragm and said auxiliary diaphragm and said auxiliary opposing pressure chamber is defined between said auxiliary diaphragm and a rear half portion of said shell.

3. The vacuum booster of claim 2, wherein the valve casing is connected to said main diaphragm and said auxiliary diaphragm.

4. The vacuum booster of claim 1, wherein said auxiliary opposing pressure chamber communicates with the atmosphere through a port provided on a rear half portion of said shell.

5. A traction control mechanism having an anti-locking brake system connected to a vacuum booster for moving a valve casing in a first direction, comprising:
   a shell having a front portion and a rear portion and having a main diaphragm and an auxiliary diaphragm enclosed therein;
   a main opposing pressure chamber, defined by said main and auxiliary diaphragms, for exerting a first pressure on said valve casing in said first direction, said first pressure being generated by a first pressure source, said first pressure source being an atmosphere, and said valve casing being connected to said main diaphragm and said auxiliary diaphragm;
   an auxiliary opposing pressure chamber defined by said auxiliary diaphragm and said rear portion of said shell, for exerting said first pressure on said valve casing in said first direction;

a continuous pressure chamber defined by the front portion of said shell and said main diaphragm, for exerting a second pressure on said valve casing, said second pressure being less than said first pressure and generated by a second pressure source related to a partial vacuum, said second pressure source being an intake manifold of an engine of a vehicle;

a prime mover means for generating said second pressure as a partial vacuum;

means for independently controlling each of said main opposing pressure chamber and said auxiliary opposing pressure chamber whereby at least one of said main opposing pressure chamber and said auxiliary opposing pressure chamber exerts said first pressure on said valve caving to move said valve casing in said first direction;

said means for independently controlling includes an operation rod coupled to a first atmosphere passage for connecting said main opposing pressure chamber to said first pressure source, a first valve coupled to a second atmosphere passage for connecting said auxiliary opposing pressure chamber to said first pressure source, and a second valve coupled to a communication passage for connecting said main opposing pressure chamber to said auxiliary opposing pressure chamber;

a push rod coupled at one end to said valve casing and at the other end to a master cylinder, wherein said movement of valve casing generates a hydraulic pressure in said master cylinder, said hydraulic pressure being applied to a brake of a driving wheel;

a sensor provided at said driving wheel for detecting the rotational frequency of said wheel; and a controller responsive to said sensor for opening or closing said first and second valves and for operating said traction control mechanism when said sensor detects a slipping rotation of said driving wheel, said traction control mechanism being operative without operation of a brake pedal.

* * * * *

UNITED STATES PATENT AND TRADEMARK OFFICE
CERTIFICATE OF CORRECTION

PATENT NO. : 5,098,170
DATED : March 24, 1992
INVENTOR(S) : NAMIO WATANABE

It is certified that error appears in the above-identified patent and that said Letters Patent is hereby corrected as shown below:

Title page, item [73] Assignee: change

"Akebono Brake Industry Co., Inc.," to
--Akebono Brake Industry Co., Ltd--.

Claim 5, column 7, line 16, change "caving" to --casing--.

Signed and Sealed this

Fourteenth Day of September, 1993

Attest:

BRUCE LEHMAN

Attesting Officer    Commissioner of Patents and Trademarks